March 1, 1932. A. STOLL 1,847,314

MACHINE ELEMENT

Filed Sept. 13, 1930

INVENTOR.
ALBERT STOLL
BY
*[signature]*
ATTORNEY

Patented Mar. 1, 1932

1,847,314

UNITED STATES PATENT OFFICE

ALBERT STOLL, OF DETROIT, MICHIGAN, ASSIGNOR TO NATIONAL MACHINE PRODUCTS COMPANY, OF DETROIT, MICHIGAN, A CORPORATION OF MICHIGAN

MACHINE ELEMENT

Application filed September 13, 1930. Serial No. 481,770.

This invention relates to machine elements and more particularly to a coupled washer and male fastener such, for example, as a cap screw, a screw bolt or a lag screw.

Briefly stated, an important object of this invention is to provide simple and expeditious means by which a lock washer may be coupled to a male fastener such, for example, as a cap screw, a screw bolt or a lag screw during manufacture of these parts to avoid the necessity of manually placing the lock washer on the shank of the male fastener and to allow the male fastener and the lock washer to be handled as a unit.

Other objects and advantages will be apparent during the course of the following description.

Figure 1:
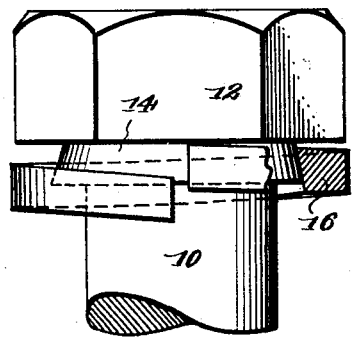
Figure 4:
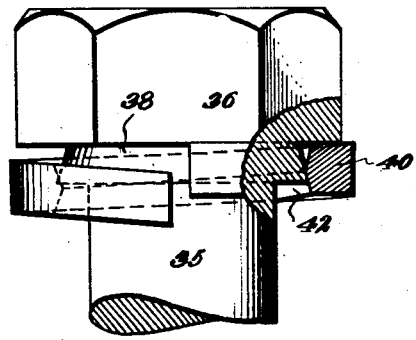
Figure 2:
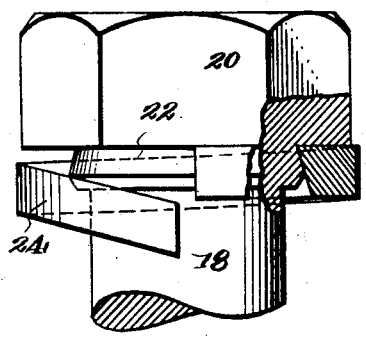
Figure 5:
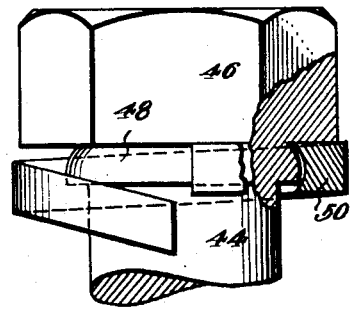
Figure 3:
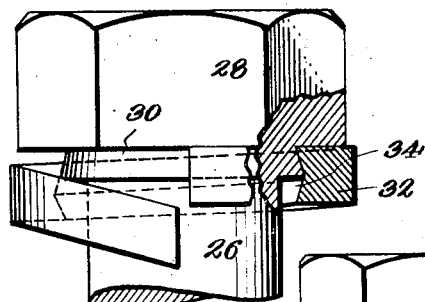
Figure 6:
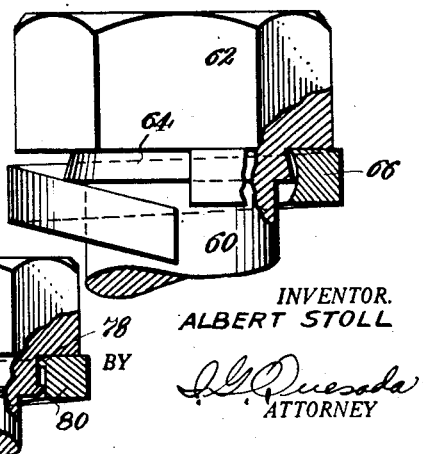
Figure 7:
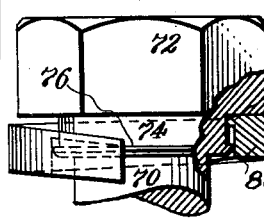

In the accompanying drawings forming a part of this application and in which like numerals are employed to designate like parts throughout the same, Figure 1 is a fragmentary side elevation of a coupled washer and male fastener, the washer being broken away to illustrate the means by which the same is secured to the male fastener, Figure 2 is a fragmentary side elevation illustrating a slight modification of the invention, Figure 3 is a similar view illustrating another embodiment of the invention, Figure 4 is a fragmentary side elevation disclosing a still further modification of the invention, Figure 5 is a fragmentary side elevation of another expression of the invention, Figure 6 is a fragmentary side elevation in which another form of the invention is disclosed, Figure 7 is a fragmentary side elevation illustrating a still further variation of the invention, parts being shown in section.

In the drawings and more particularly Figure 1 thereof, the numeral 10 designates the shank of a male fastener such, for example, as a cap screw or a screw bolt and which is provided with an integral polygonal head 12. At the meeting point of the shank 10 and the head 12 there is provided an annular coupling member 14 integral with both of these parts and having a diameter greater than the diameter of the shank and less than the diameter of the head.

The annular coupling member is more or less closely embraced by the single convolution of a longitudinally compressible helical split lock washer 16 having sufficient strength to resist radial expansion although it is believed to be clear that the resiliency of the spring washer must be such as to allow the same to be sprung over the coupling shoulder. The annular coupling shoulder 14 is shown to be flared uniformly from the upper to the lower edges thereof to provide an inclined face more or less closely embraced by the similarly inclined opposed face or inner edge of the washer. More specifically, the inner face or edge of the washer 16 is inclined from the lower to the upper edges thereof on a straight line to match the inclination of the shoulder 14. Also, the minimum internal diameter of the washer 16 is less than the maximum external diameter of the shoulder so that endwise accidental slipping of the washer from the coupling shoulder is restricted.

In the form of invention illustrated in Figure 2, the male fastener is provided at the meeting point of the shank 18 and the head 20 with an annular integral coupling shoulder 22 flared from the base of the head 20 to a point spaced rearwardly of the lower edge of the shoulder and bevelled from the lower terminal of the flared portion to the lower edge of the shoulder to provide separate faces in intersecting planes, the lower or bevelled face constituting a sort of wedge by which necessary radial expansion of the split helical washer 24 during the coupling operation is aided, while the upper or flared face of the shoulder 22 coacts with the opposed inner face of the washer in securing the washer to the fastener. The inner face of the washer 24 is shown to be inclined from opposite impinging faces thereof on an angle corresponding to the angle of the flared upper portion of the coupling shoulder 22 so that when the washer is applied the opposed complemental faces of the washer and the coupling member will be flatly in contact or nearly so.

In the form of invention illustrated in Figure 3, the male fastener is provided with a shank 26 and a head 28 and with an annular shoulder 30 at the meeting point of the shank and the head and being integral with these parts. The annular shoulder 30 is flared from the upper end thereof, or from the base of the head of the fastener, to the lower edge thereof and is more or less closely embraced by a longitudinally compressible split helical lock washer 32 of resilient material. The inner face of the lock washer 32 is shown to be provided with a circumferential groove substantially V-shaped in cross section to define oppositely inclined contact faces 34 disposed in intersecting planes and adapted for random presentation to the coupling shoulder 30. That is to say, the faces 34 are disposed on the same angle as the flared surface of the shoulder 30 making it possible to apply the washer 32 to the male fastener from either side of the washer. Thus, it is not necessary to present a particular side of the washer to the head preparatory to coupling the washer to the fastener.

In Figure 4, the male fastener is provided at the meeting point of the shank 35 and the head 36 thereof with an integral annular shoulder 38 flared from the upper end thereof or base of the nut to the lower end thereof and embraced by a longitudinally compressible split helical washer 40 preferably of resilient material.

The inner face of the washer 40 is bevelled from substantially the medial line thereof to the opposite impinging faces of the washer to provide contact faces 42 disposed in intersecting planes and on an angle corresponding to the angle of the face of the shoulder 38. In this manner, the presentation of the washer from either side thereof to the coupling shoulder 38 is made possible. This arrangement not only permits random application of the washer to the shoulder but facilitates coupling of the washer to the shoulder for the reason that the face 42 which happens to be closer to the base of the head 36 defines a gradually restricted entrance opening for the shoulder 38.

In the form of invention illustrated in Figure 5, the male fastener is provided at the meeting point of the shank 44 and the head 46 with an annular coupling shoulder 48 rounded or beaded from the upper end thereof or base of the nut to the lower end thereof and more or less closely surrounded by a longitudinally compressible split spring lock washer 50, the inner face of the washer being transversely curved or recessed to define an annular groove receiving the outwardly rounded portion of the shoulder. The interlocking relation of the beaded shoulder 48 and the grooved washer 50 holds the washer in place on the shoulder and since the groove in the inner face of the washer opens out through opposite impinging faces of the washer, it is possible to present either side of the washer to the member 48 for the coupling operation.

In the form of invention illustrated in Figure 6, the male fastener is provided at the meeting point of the shank 60 and the head 62 with an annular shoulder 64 flared on a straight line from the upper end thereof, or base of the head, to the lower end thereof and more or less closely embraced by a longitudinally compressible split spring lock washer 66. The inner face of the washer 66 is recessed transversely to define a circumferential groove extending out through the upper and lower impinging faces of the washer and adapted for the reception of the flared portion of the shoulder 64. In this case, the washer may be presented from either side thereof to the coupling shoulder 64.

In the form of invention shown in Figure 7, the male fastener, of whatever nature it happens to be, is formed at the meeting point of the shank 70 and the polygonal head 72 with an annular shoulder 74 of greater diameter than the diameter of the shank and of a smaller diameter than that of the head. The lower portion of the annular coupling shoulder 74 is shown to be abruptly enlarged to provide an external retaining rib 76 cooperating with a rib 78 on the inner face of the washer 80 in securing the washer to the male fastener. More specifically, the complemental ribs 76 and 78 limit endwise movement of the washer on the coupling shoulder. The lower edge of the rib 76 is bevelled to cooperate with the bevelled outer edge of the internal rib 78 to facilitate temporary expansion of the washer during the coupling operation.

The coupling means shown in the various forms of invention make it possible to attach the washer to the male fastener of whatever nature it happens to be without in any way limiting the outside diameter in which the washer may be made. For example, in the drawings the washer is shown to have an outside diameter at least equal to the maximum diameter of the head of the fastener and in some views is shown to have an outside diameter greater than the maximum diameter of the head of the fastener, this being simply a matter determined by the use that is made of the fastener and the washer.

By permanently coupling the washer to the nut these parts may be handled as a unit and the necessity of manually mounting the washer on the shank of the fastener avoided. Also, the location of the annular coupling shoulder at the meeting point of the shank and the head of the fastener strengthens this connection.

Having thus described the invention, what is claimed is:

1. In an assembly of the class described, a male fastener having a shank and a head and an annular shoulder at the meeting point of the shank and the head, the shoulder being provided with an external face inclined with respect to the axis of the male fastener, and a split washer surrounding the shoulder and having the inner side thereof provided with separate shoulder contact faces in intersecting planes, said faces on the inner side of said washer extending out through opposite impinging faces of the washer and adaptable for random presentation to said shoulder.

2. In an assembly of the character described, a male fastener having a shank and a head and a shoulder at the meeting point of the shank and the head, said shoulder being provided with an external inclined face, and a washer closely embracing said shoulder and having the inner side thereof formed with a groove substantially V-shaped in cross section to define separate contacting faces adaptable for random presentation to the inclined face of said shoulder.

3. In an assembly of the class described, a male fastener having a shank and a head and a solid annular shoulder at the meeting point of the shank and head, the outer surface of said shoulder being rounded to form a bead, and a washer of split formation having the inner surface thereof recessed transversely on a curved line to define a groove receiving the bead of said shoulder.

4. In an assembly of the class described, a male fastener having a shank and a head and a shoulder at the meeting point of the shank and head, said shoulder being flared on a straight line from the upper to the lower end thereof, and a split washer embracing said shoulder and having the inner face thereof recessed on an arcuate line to define a circumferential groove receiving said shoulder.

5. In a structure of the class described, a screw-threaded body having a bearing surface and an annular concentric washer coupling portion contiguous to the bearing surface, and a resilient lock washer embracing said coupling portion and having the inner side thereof formed with a groove opening out through opposite impinging faces of the washer thereby adapting the washer for random application to said coupling portion.

6. In a structure of the class described, a screw-threaded body, a bearing surface and an annular concentric washer coupling portion contiguous to the bearing surface, said coupling portion being flared to provide an inclined wall, and a resilient lock washer having the inner wall thereof provided with separate angularly extending faces in intersecting planes and corresponding to the flare of said coupling portions, said separate faces being extended out through opposite impinging faces of said washer to adapt the washer for random presentation to said coupling portion.

In testimony whereof I affix my signature.

ALBERT STOLL.